March 25, 1958   H. D. WITZEL   2,828,003
TAKE-UP MECHANISM FOR ELEVATOR CONVEYOR
Filed July 28, 1955   2 Sheets-Sheet 1

INVENTOR.
HOMER D. WITZEL

March 25, 1958     H. D. WITZEL     2,828,003
TAKE-UP MECHANISM FOR ELEVATOR CONVEYOR
Filed July 28, 1955     2 Sheets-Sheet 2

INVENTOR.
HOMER D. WITZEL

United States Patent Office 2,828,003
Patented Mar. 25, 1958

2,828,003

TAKE-UP MECHANISM FOR ELEVATOR CONVEYOR

Homer D. Witzel, Bettendorf, Iowa, assignor to Deere & Company, Moline, Ill., a corporation of Illinois Application July 28, 1955, Serial No. 524,872

3 Claims. (Cl. 198—208)

This invention relates to an elevator of the type in which a chain conveyor is utilized to move material along a conveyor deck from a material intake end to a material discharge end and which is operated over sprockets mounted on transverse shafts positioned at opposite ends of the elevator. More particularly, this invention relates to a conveyor take-up mechanism which is operative to maintain the shafts or the bearings of the shafts in alinement with one another.

In applying take-up to a chain type of conveyor there are usually two problems existent which ultimately affect the operational efficiency of the elevator. The first problem is created by the amount of gap or space which exists between the upper or discharge edge of the deck plate and the transverse shaft proximate to that edge. As the gap or space increases due to the increased amount of take-up in the chain of the conveyor, material passing over the deck will fall in this gap in increased quantities ultimately to be returned either to the earth or to the intake end of the elevator where the cycle is then repeated. The second problem which must be considered is that of maintaining the transverse sprocket shafts in alinement with one another so that the shaft bearings support the load on the shafts in equal quantities. This latter problem becomes particularly acute when the shaft is also used as a drive or a driven shaft functioning with an outside drive. This will normally create a condition in which the shaft is over-balanced at one end thereby making proper alinement of the shafts even more difficult than that which would normally be created by the conveyor.

It is a purpose of this invention to provide a new and novel method of obtaining take-up on the adjustable shaft by a simple mechanism which provides a surfaced portion which bridges the gap between the end of the deck plate and the transverse shaft and which also serves to maintain the adjustable shaft in perfect alinement with the transverse shaft at the opposite end of the elevator.

It is also a purpose of this invention to provide a take-up mechanism for a chain conveyor in which both ends of the adjustable shaft are adjusted at the same time and by the same adjusting force.

It is still a further purpose of this invention to provide a take-up mechanism of the type described in which the movable parts are disposed within the elevator housing and are completely protected from the elements as well as the material being conveyed. In this manner the movable parts are protected against rust and corrosion or from the material being conveyed.

Other objects and advantages of the invention will become apparent to those skilled in the art as the nature of the invention is better understood from the following detailed description illustrated in the accompanying drawings.

Figures 1, 2:
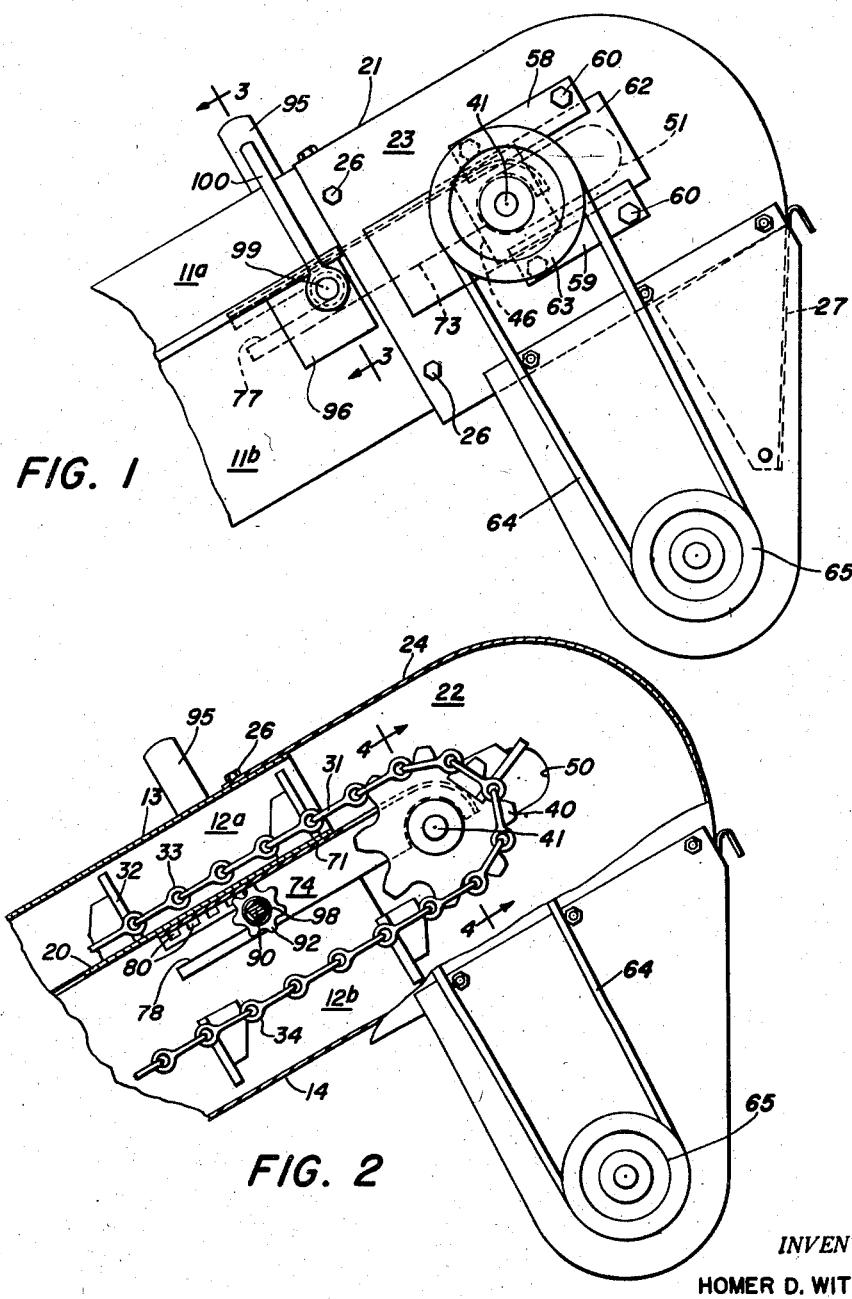
Fig. 1 is a side elevation of an upper end of an elevator of the type having a V-belt drive driven off the upper transverse shaft and incorporating the present invention.
Fig. 2 is a cut-away and sectional view of the elevator as shown in Fig. 1.
Figure 3:
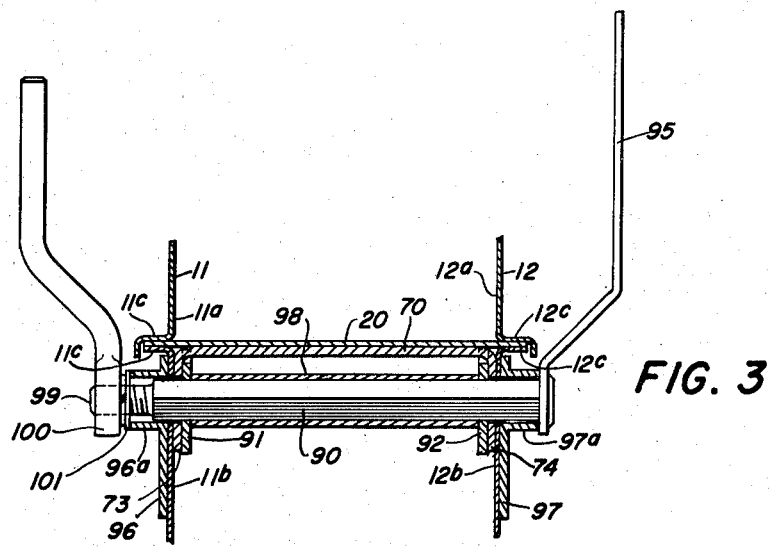
Fig. 3 is an enlarged sectional view taken along the lines 3—3 of Fig. 1.
Figure 4:
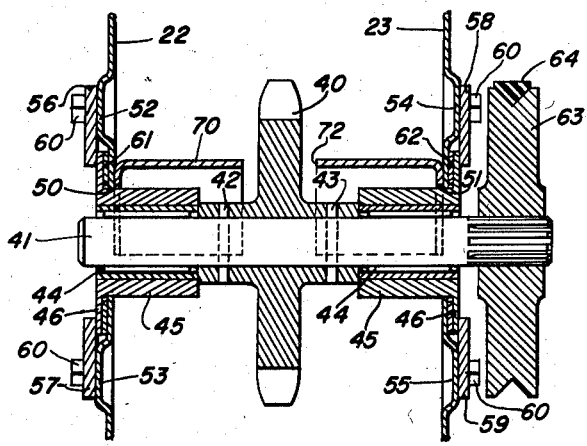
Fig. 4 is an enlarged sectional view taken along the lines 4—4 of Fig. 2.
Figure 5:
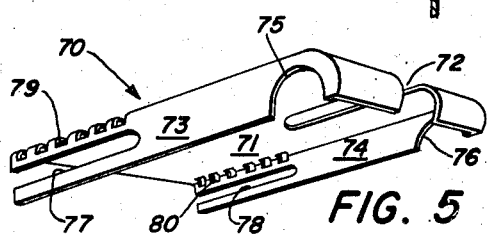
Fig. 5 is a front left perspective view looking upwardly into a part of the take-up mechanism.

Referring first to Fig. 1, the elevator comprises an elevator housing including laterally spaced apart side panels 11 and 12 interconnected at their upper and lower edges respectively by an upper transverse panel 13 and a lower transverse panel 14. The side panels 11 and 12 are made up of upper and lower adjacent portions, 11a and 11b on the left side panel and 12a and 12b on the right side panel, left and right being determined by viewing the elevator from its discharge end in a direction toward its intake end. The upper or lower sections have lateral flanges as at 11c and 12c which lie adjacent to a laterally disposed conveyor plate 20 which extends between the side panels for substantially the length of the elevator housing. Suitable spot welds, not shown, maintain the plate member 20 and the flanges 11c and 12c in a fixed relationship. Positioned at the upper end of the elevator housing 10 is an additional housing 21 comprising two depending side portions 22 and 23 respectively interconnected at their upper edges by a laterally disposed portion 24 which is turned downwardly at the upper edges of the side portions 22 and 23 and forms with the portions 22 and 23 a discharge opening through which material moving through the elevator may gravitate. The portions 22—24 of the additional housing 21 telescope over the upper portion of the main elevator housing and are fixed to the elevator housing by bolts 26. Also provided at the upper discharge end of the elevator is a shield 27 for directing the stream of materials discharging from the elevator.

A chain conveyor comprises a centrally positioned chain 31 and longitudinally spaced apart paddles 32 and has upper and lower runs 33 and 34. The upper run 33 of the chain conveyor moves over the conveyor plate 20 and is operative to cause the paddles 32 to engage material at a lower material intake end, not shown, and to move it upwardly and along the upper surface of the deck or conveyor plate 20.

The chain conveyor operates over conventional sprocket means mounted at the lower and upper ends of the elevator. Included in the upper sprocket means is a central sprocket 40 mounted on an upper transverse sprocket shaft 41 by pins 42 and 43 which fixes the sprocket 40 against both axial and radial movement relative to the shaft 41. The shaft 41 is rotatably mounted in bearings 44 contained in a pair of bearing housings 45 extending from a position inwardly of the respective side portions 22, 23 where they abut the hub of the sprocket 40 to a position outwardly of the side panels 22 and 23 where each of the housings 45 has an integral rectangular shaped flange portion 46.

Provided in the side portions 22 and 23 are longitudinally extending slots 50 and 51, respectively, through which the bearing housings 45 extend, for permitting longitudinal adjustment of the transverse shaft 41. Spaced above the longitudinal slot 50 is a boss portion 52 which projects outwardly from the side 22. A similar boss portion 53 is equally spaced below the elongated slot 50. Similar boss portions 54 and 55 are also provided in the left side panel 23 and relative to the slot 51. Mounted on the boss portions 52—55 are guide plates or rails 56, 57, 58, 59, which are secured by means of bolts as at 60. The guide rails 56—59 serve to secure the bearing housing 45 to the side panels 22 and 23 by providing overlying portions which engage the upper and lower edges of the flange portions 46. The inner surfaces of the guide rails 56—59 and the outer surfaces of the side panels 22 and 23 adjacent to the flange portions 46 are sufficiently spaced to permit the bearing housings 45 to move longitudinally relative to the elevator housing. Therefore, when take-up is desired, the transverse shaft may be moved longitudinally in the slots 51 and 52. Rigidly fixed, as by welding or other suitable means, to the inner surfaces of the flange portions 46 are elongated sheet metal plates 61, 62 which extend equally distant on both ends of the housings 45. As shown in Fig. 1 the sheet metal plates 61 and 62 are of sufficient length to cover the elongated slots 50 and 51 at all times. Therefore, as the transverse shaft 41 is moved to provide take-up in the chain conveyor, the plates 61 and 62 move a corresponding amount and will always cover the slots 50 and 51 thereby preventing material from being discharged through the slots. Mounted on the left end of the shaft 41 is a drive pulley 63 which is a part of a V-belt drive, including a V-belt 64 and a driven pulley 65, which is operated off the shaft 41.

The take-up adjusting mechanism comprises a U-shaped elongated member 70 having a laterally disposed section 71 with its lower end portion underlying and in sliding engagement with the plate member 20 and with its upper end portion turned downwardly to extend over the transverse shaft 41. The laterally disposed section 71 serves as an extension of the plate member 20 and bridges the space or gap existing between the upper end of the plate member 20 and the transverse shaft 41. The laterally disposed surface 71 is slotted as at 72 to permit the toothed portion of the sprocket 40 to project outwardly relative to the surface 71. The elongated member 70 is also provided with two depending side portions 73, 74 which are adjacent to the lower portions 11b and 12b of the side panels 11 and 12. The upper ends of the side portions 73 and 74 are formed as at 75 and at 76 to engage and grip the bearing housings 45. The rearward end of the side portions 73 and 74 are slotted in a longitudinal direction as at 77 and 78. Directly above the elongated slots 77 and 78 are longitudinally spaced apart and transversely aligned slots 79 and 80, the purpose of which will presently be disclosed.

A square sectioned transverse shaft 90 extends across the elevator housing 10. The shaft 90 is positioned to extend through the slots 77 and 78 and has opposite ends rotatably mounted in the respective portions 11b and 12b of the side panels 11 and 12. A pair of transversely spaced apart pinions 90 and 91 are fixed to the shaft 90 with each of the pinions being positioned proximate to one of the depending side sections or portions 73 and 74. The toothed portions of the pinions 91 and 92 are engageable in the slots 79 and 80 of the elongated member 70. In this manner the slots 79 and 80 serve as ratchet means on the elongated member 70 and operate upon rotation of the square sectioned shaft 90 to move the elongated member 70 longitudinally.

Means for rotating the pinion or square sectioned drive shaft 90 is provided by a handle or lever 95 which is fixed to the right end of the shaft 90. Mounted adjacent to an outboard of the lower panel sections 11b and 12b are a pair of reinforcing plates 96 and 97, respectively, which include hub portions 96a and 97a for rotatingly receiving opposite ends of the transverse shaft 90. Also mounted on the square sectioned shaft 90 for rotation relative thereto is a rigid tubular member 98 extending between and having opposite ends abutting against the pinions 91 and 92. The left end of the pinion drive shaft 90 is threaded as at 99 and engages a tail or lock nut 100 which has a radially extending arm affixed thereto for applying leverage. A collar 101 separates the lock nut 100 from the outer edge of the hub 96a. By drawing the nut 100 tightly against the washer 101 and hubs 96a and 97a, and the tubular member 98 will cause the adjacent surfaces of the pinion members 91 and 92, the depending portions 73, 74, and the adjacent lower portions 11b and 12b of the side panels to engage one another thereby frictionally resisting rotation of the shaft 90 as well as longitudinal movement of the elongated member 70.

The take-up adjusting mechanism operates in the following manner. The lock nut 100 is first loosened to permit the drive shaft 90 to be rotated by the lever 95. This in turn causes the elongated member 70 to move in a longitudinal direction, which for purposes of take-up would be longitudinally upwardly, which in turn moves the transverse shaft 41 a corresponding amount. The forward ends of the side portions 73 and 74 being in transverse alinement will obviously cause the transverse shaft 41 to be maintained in transverse alinement with the lower drive shaft and thus maintain equal pressure on the bearings 44. Likewise the transverse shaft 41 will positively be held against movement when the pinion drive shaft is locked against movement, and thus a load applied on the pulley 63 will be ineffective to cause misalinement of the shaft 41.

While only a single form of the invention has been shown, it should be recognized that other forms and variations could exist without departing basically from the broad basic principles herein disclosed. It should, therefore, be understood that while the preferred form of the invention has been described with the view of clearly and concisely illustrating it, there is no desire to so limit or narrow the invention beyond that which is claimed.

What is claimed is:

1. A conveyor take-up mechanism for use with an elevator having an elevator housing including laterally spaced apart vertical side panels, a laterally disposed plate member extending between the side panels, a chain conveyor for moving material along the plate member operative over sprocket means mounted on a transverse shaft mounted at one end of the elevator for longitudinal movement, the shaft being spaced longitudinally from the end of the plate member thereby providing a gap between the shaft and the plate member, the take-up mechanism comprising: a U-shaped elongated member having a laterally disposed section bridging the gap with an end portion in sliding engagement with the plate member and with the other end portion turned to extend over the transverse shaft, and a pair of vertically disposed side sections, each being adjacent to a respective side panel, each having means at one end thereof for gripping the transverse shaft, and each having a longitudinally extending slot in transverse alinement with the slot of the other; a transverse pinion drive shaft positionable in the slots and having opposite ends rotatably mounted in the respective side panels; a pair of transversely spaced pinions mounted on the pinion drive shaft, each of the pinions being positioned proximate to one of the vertically disposed side sections and engageable with complementary rack means on the elongated member for moving the elongated member longitudinally and relative to the elevator housing upon rotation of the pinion drive shaft; means connected to the pinion drive shaft for rotating the drive shaft; and means for locking the elongated member against movement relative to the elevator housing.

2. A conveyor take-up mechanism for use with an elevator having an elevator housing including laterally spaced apart side panels, a laterally disposed plate member extending between the side panels, a chain conveyor for moving material along the plate member and operative over sprocket means mounted on a transverse shaft mounted at one end of the elevator for longitudinal movement, the shaft being spaced longitudinally from the end of the plate member thereby providing a gap between the shaft and the plate member, the take-up mechanism comprising: a U-shaped elongated member having a laterally disposed section bridging the gap with an end portion in sliding engagement with the plate member and with the other end portion turned to extend over the transverse shaft, and a pair of vertically disposed side sections, each being adjacent to a respective side panel and each having means at one end thereof for gripping the transverse shaft, a transverse pinion drive shaft positioned beneath the elongated member and having opposite ends rotatably mounted in the respective side panels; a pair of transversely spaced pinions mounted on the pinion drive shaft, each of the pinions being positioned proximate to and inwardly of one of the vertically disposed side sections and engageable with complementary rack means on the elongated member for moving the elongated member longitudinally and relative to the elevator housing upon rotation of the pinion drive shaft; means connected to the pinion drive shaft for rotating the drive shaft; and means for locking the elongated member against movement relative to the elevator housing.

3. The invention defined in claim 2, in which the rack means is provided by longitudinally spaced openings in the elongated member operative to receive the teeth of the pinions as the pinions rotate.

References Cited in the file of this patent

UNITED STATES PATENTS

| | | |
|---|---|---|
| 832,361 | Blevins | Oct. 2, 1906 |
| 1,347,121 | Rue | July 20, 1920 |
| 2,493,333 | Baehr | Jan. 3, 1950 |